US006977794B1

(12) United States Patent
Sun et al.

(10) Patent No.: US 6,977,794 B1
(45) Date of Patent: Dec. 20, 2005

(54) ASYMMETRIC SEEK VELOCITY PROFILE TO IMPROVE POWER FAILURE RELIABILITY FOR RIGID DISK DRIVE WITH RAMP

(75) Inventors: Yu Sun, Fremont, CA (US); Mark Rice, San Jose, CA (US); Don Brunnett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 255 days.

(21) Appl. No.: 09/905,563

(22) Filed: Jul. 13, 2001

Related U.S. Application Data

(60) Provisional application No. 60/218,108, filed on Jul. 13, 2000.

(51) Int. Cl.[7] ......................... G11B 5/596; G11B 21/02
(52) U.S. Cl. ...................................... 360/78.06; 360/75
(58) Field of Search .............................. 360/75, 78.01, 360/78.04, 78.06, 78.08; 318/561, 280, 368, 318/632, 364

(56) References Cited

U.S. PATENT DOCUMENTS

| | | | | |
|---|---|---|---|---|
| 5,495,156 | A * | 2/1996 | Wilson et al. | 318/368 |
| 5,889,629 | A * | 3/1999 | Patton, III | 360/75 |
| 5,912,782 | A * | 6/1999 | Lee et al. | 360/78.09 |
| 5,969,899 | A * | 10/1999 | Utenick et al. | 360/78.04 |
| 6,125,000 | A | 9/2000 | Carlson et al. | 360/78.08 |
| 6,140,784 | A * | 10/2000 | Mazda | 318/280 |
| 6,169,382 | B1 * | 1/2001 | McKenzie et al. | 318/561 |
| 6,687,081 | B1 * | 2/2004 | O'Hara et al. | 360/78.07 |

* cited by examiner

*Primary Examiner*—Andrew L. Sniezek
(74) *Attorney, Agent, or Firm*—Tejpal S. Hansra

(57) ABSTRACT

A disk drive having a control system which adjusts seek velocity profiles is disclosed. The seek velocity profile is adjusted based on the direction of the seek and the location of the target track. If the seek is away from the ramp, the seek velocity profile is not adjusted. If the seek is toward the ramp, the control system determines the location of the target track. If the target track is within a predefined distance of the ramp, and the transducer velocity exceeds a predetermined velocity, the seek velocity profile is adjusted to limit the deceleration current. The adjustment may be a preset factor, or may be a variable factor depending upon the distance from the target track to the ramp.

52 Claims, 8 Drawing Sheets

ASYMMETRIC SEEK VELOCITY PROFILE TO IMPROVE POWER FAILURE RELIABILITY FOR RIGID DISK DRIVE WITH RAMP

Priority is claimed from U.S. Provisional Patent Application No. 60/218,108, filed Jul. 13, 2000 entitled "Asymmetric Seek Velocity Profile To Improve Power Failure Reliability For Rigid Disk Drive," which is incorporated by reference in its entirety.

FIELD OF THE INVENTION

The present invention relates to computer disk drives, and more particularly, to a method and apparatus for providing an asymmetric seek velocity profile with improved power failure reliability.

BACKGROUND OF THE INVENTION

Computer disk drives store information on magnetic disks. Typically, the information is stored on each disk in concentric tracks, or cylinders, that are divided into sectors. Information is written to and read from a disk by a transducer that is mounted on an actuator arm capable of moving the transducer radially over the disk, allowing the transducer to be located in proximity to different cylinders. The disk is rotated by a spindle motor at high speed which allows the transducer to access different sectors on the disk.

A diagrammatic representation of a conventional disk drive, generally designated 10, is illustrated in FIG. 1. The disk drive comprises a disk 12 that is rotated by a spindle motor 14. The spindle motor 14 is mounted to a base plate 16. An actuator arm assembly 18 is also mounted to the base plate 16. The disk drive 10 also includes a cover (not shown) that is coupled to the base plate 16 and encloses the disk 12 and actuator arm assembly 18.

The actuator arm assembly 18 includes a flexure arm 20 attached to an actuator arm 22. A transducer 24 is mounted near the end of the flexure arm 20. The transducer 24 is constructed to magnetize the disk 12 and sense the magnetic field emanating therefrom. Attached to the end of the flexure arm 20 is a ramp tab 25, which engages with a ramp 26 when the actuator arm assembly 18 is parked, as will be described in more detail below. It should be noted that ramp 26 may be located either at the inner diameter of the disk 12, or at the outer diameter of the disk 12. The actuator arm assembly 18 pivots about a bearing assembly 27 that is mounted to the base plate 16.

Attached to the end of the actuator arm assembly 18 is a magnet 28 located between a pair of coils 30. The magnet 28 and coils 30 are commonly referred to as a voice coil motor 32 (VCM). The spindle motor 14, transducer 24 and VCM 32 are coupled to a number of electronic circuits 34 mounted to a printed circuit board 36, which comprise the control electronics of the disk drive 10. The electronic circuits 34 typically include a read channel chip, a microprocessor-based controller and a random access memory (RAM) device.

The disk drive 10 typically includes a plurality of disks 12 and, therefore, a plurality of corresponding transducers 24 mounted to flexure arms 20 for the top and bottom of each disk surface. However, it is also possible for the disk drive 10 to include a single disk 12 as shown in FIG. 1.

The flexure arm 20 is manufactured to have a bias such that if the disk 12 is not spinning, the transducer 24 will come into contact with the disk surface 12. When the disk is spinning, the transducer 24 typically moves above, or below, the disk surface at a very close distance, called the fly height. This distance is maintained by the use of an air bearing, which is created by the spinning of the disk 12 surface such that a boundary layer of air is compressed between the spinning disk 12 surface and the transducer 24. The flexure arm 20 bias forces the transducer 24 closer to the disk 12 surface, while the air bearing forces the transducer 24 away from the disk 12 surface. Thus, the flexure arm 20 bias and air bearing act together to maintain the desired fly height when the disk 12 is spinning.

It will be understood that if the disk 12 is not spinning at a high enough RPM, the air bearing produced under the transducer 24 may not provide enough force to prevent the flexure arm 20 bias from forcing the transducer 24 to contact the disk 12 surface. If the transducer 24 contacts an area on the disk 12 surface that contains data, some of the data may be lost. To avoid this, the actuator arm assembly 18 is generally positioned such that the transducer 24 does not contact a data-containing area of the disk 12 when the disk 12 is not spinning, or when the disk 12 is not spinning at a high enough RPM to maintain an air bearing.

In a load/unload (L/UL) drive, as illustrated in FIG. 1, the ramp tab 25 located at the end of the flexure arm 20 is parked on a ramp 26 when the disk is not spinning. Parking the ramp tab 25 on the ramp 26 prevents the bias from the flexure arm 20 from forcing the transducer 24 into contact with the disk 12 surface when the disk 12 is not spinning, thus helping to avoid data loss.

With reference now to FIG. 2, a diagrammatic representation illustrating a side view of a simple ramp 26 is now described. The ramp 26 has an upper ramp portion 50 and a lower ramp portion 54. Thus, when the ramp tab 25 engages the upper or lower ramp portion 50, 54, it moves along the ramp and into a parked position. Located at the end of the ramp 26 farthest away from the disk 12 is a crash stop 58. The crash stop 58 acts to prevent the actuator arm assembly 18 from traveling beyond its range of motion, which can cause damage to the actuator arm assembly 18. The crash stop 18 is typically made of a material, such as plastic, which can absorb some amount of energy from an impact.

As mentioned above, when performing read and write functions, the transducer 24 is positioned above the track associated with the data to be read or written. When a disk drive 10 receives a request to access a certain track, it must move the actuator arm assembly 18 and transducer 24 to the associated track. A servo control system is generally used to control the VCM 32 and locate the transducer 24 above the appropriate track. Servo control systems generally perform two distinct functions: seek control and track following. The seek control function comprises controllably moving the transducer 24 from an initial track position to a target track position. In this regard, the servo control system receives a command from a host computer that data is to be written to or read from a target track of the disk, and the servo system proceeds to move the transducer 24 to the target track from the track where it is currently located. Once the transducer 24 is moved sufficiently near the target track, the track following function is performed to center and maintain the transducer 24 on the target track until the desired data transfer is completed.

When performing a seek function, it is desirable to reduce the amount of time it takes for a transducer 24 to move from its starting track to the target track. Average seek time is a measure of how fast, on average, a disk drive takes to move a transducer 24 to a target track from a starting track after a command is received from a host computer to access the target track. Because speed is a very important attribute in computer systems, average seek time is generally used as one of the indications of the quality or usefulness of a disk drive. Therefore, it is highly desirable to reduce the average seek time of a disk drive as much as possible.

When performing a seek function, the servo system generally moves the transducer 24 according to a seek profile. A typical seek profile includes an acceleration portion and a deceleration portion, with the transducer 24 reaching a peak velocity at the end of the acceleration portion. The length of the seek is defined as the distance between the starting track and the target track. For relatively long seek lengths, the actuator arm assembly 18, and transducer 24, may reach a peak velocity, and coast for a period of time at a relatively constant velocity prior to decelerating. Likewise, for relatively short seek lengths, the velocity of the transducer 24 may not reach the peak velocity prior to decelerating. Thus, the shape of the seek profile depends upon the seek length, and may or may not include a coasting portion where the velocity of the transducer 24 reaches the peak velocity.

As mentioned above, in normal operation, when a disk drive 10 is shut down, the control electronics 34 operate to position the actuator assembly 18 such that the transducer 24 does not contact the data containing portion of the disk 12 surface when the disk 12 stops spinning. In certain situations, however, a disk drive 10 may lose power while a transducer 24 is flying over the disk 12 surface where customer data is stored. Such situations may, for example, include a loss of power to the computer system containing the disk drive, a power supply malfunction within the computer or disk drive, or an inadvertent disconnect of the power to the disk drive prior to the drive being shut down. In order to reduce the chances of data being lost when a power failure occurs, methods and apparatuses have been developed which position the actuator arm assembly 18 such that the transducer 24 will not contact the data-containing portion of the disk 12 surface. One conventional method for parking the transducer 24 is to actuate a retract circuit to place the ramp tab 25 of the actuator arm assembly 18 on the ramp 26, thus clearing the transducer 24 of the data containing area of the disk 12.

The retract circuit is typically contained within the electronic circuits 34, and is generally powered using the back electromotive force (BEMF) generated from the windings of the spindle motor 14. When a power loss is detected, an automatic park cycle is initiated, and the retract circuit is electrically connected to the windings of the spindle motor 14. The retract circuit actuates the VCM 32 and parks the actuator arm assembly 18 to clear the transducer 24 from the area of the disk 12 surface which contains customer data.

However, in certain situations, the loss of power may occur while the disk drive 10 is performing a seek function. If the actuator arm assembly 18 is seeking toward the ramp 26 at a high enough speed, the BEMF from the spindle motor windings may not generate enough voltage to slow the actuator arm assembly 18 down significantly, and the ramp tab 25 may load onto the ramp 26 at a high rate of speed (see FIGS. 1 and 2). If the actuator arm assembly 18 is traveling at a sufficiently high velocity, the ramp tab 25 may hit the crash stop 58, bounce back off of the crash stop 58, travel back off of the ramp 26 and over the disk 12 surface. In such a situation, the actuator arm assembly 18 may be in an uncontrolled state, which may cause the transducer 24 to come into contact with the disk 12 surface, and potentially damage the disk 12 surface which can result in loss of customer data. Such an event may also cause damage to the transducer 24. Furthermore, if the ramp tab 25 hits the crash stop 58 at a high velocity, it may cause mechanical damage to the crash stop 58 and/or the ramp tab 25.

A common solution to this problem has been to derate seek profiles to ensure that the actuator arm assembly 18 and transducer 24 do not travel at a velocity high enough for such a situation to occur. This is typically achieved by creating a seek profile which limits the velocity at which the actuator arm assembly 18 is allowed to travel. While this solution reduces instances of the ramp tab 25 bouncing off of the crash stop 58, it also results in a seek velocity profile which has an increased seek time compared to a seek velocity profile which does not limit the actuator arm assemblyl8 and transducer 24 velocity.

Another solution has been to use a disk having a glass surface which is more robust and less susceptible to damage and, therefore, less susceptible to data loss. However, glass media can add additional expense to the manufacture of the disk drive compared to the more common aluminum media and, thus, can result in a higher cost to the consumer. Furthermore, the glass layer makes magnetic recording more difficult.

Still another solution is to ensure that the power to the disk drive is not removed prior to a controlled disk drive shut down. This solution is common in mobile platforms where a battery is available to supply power to the computer system rather than, or in addition to, a power supply connected to an external power source. In such a platform, even if a user disconnects the external power supply, the battery is still available to provide power to the system. Additionally, the power switch in such a system typically is connected to circuitry which performs a controlled shut down of the system if it is pressed by a user. However, in non-mobile platforms adding a battery increases overall costs.

In yet another solution, a latch may be provided which engages the actuator arm. The use of a latch to secure the actuator arm on the ramp is well known in the art. Using the latch to engage the actuator arm when it is traveling at a relatively high velocity can prevent the transducer from bouncing off of the crash stop and reloading onto the disk. However, such a latch is more complex to design and manufacture, again resulting in additional cost to manufacture the disk drive.

Accordingly, there is a need to develop a method and apparatus for use during a power loss to a disk drive which: (1) reduces the instances of the actuator arm assembly bouncing off the crash stop and over data containing areas of the disk when power is lost to the disk drive, (2) has a reduced effect on average seek time as compared to systems which limit transducer velocity on all seeks, and (3) is able to be implemented largely in firmware thereby requiring little or no additional hardware modifications over existing designs.

SUMMARY OF THE INVENTION

The present invention relates to a disk drive seek control system which is capable of rapidly moving a transducer from an initial position to a target position for use in reading data from or writing data to a desired data track. The system derates the seek velocity profile only in situations where it is likely that, should a power failure occur, the actuator arm may bounce off of the crash stop and reload back onto the disk, thereby reducing average seek times considerably over past designs. In addition, the system is of relatively low complexity and cost.

To achieve the above benefits, in one embodiment, the system uses an asymmetric seek velocity profile, where seeks towards the ramp may be derated and seeks away from the ramp are not derated. In this embodiment, the system first determines if the transducer is seeking toward the ramp or away from the ramp. If the transducer is seeking away from the ramp, the seek velocity profile is not derated. If the transducer is seeking toward the ramp, the system determines the velocity that the transducer will reach at various tracks during the seek, absent any derating. If the velocity will exceed a predetermined velocity determined for a particular track, the system derates the seek velocity profile such that the velocity does not exceed the predetermined velocity for any track over which the seek is occurring. The predetermined velocity is based upon, at least, the distance from the track to the ramp.

In another embodiment, the system uses an asymmetric seek velocity profile which employs a variable derate factor to derate the seek velocity profile of certain seeks which are seeking toward the ramp. In this embodiment, the control electronics within the disk drive determine the direction of travel of the transducer during the seek. If the direction of travel is away from the ramp, the seek velocity profile is not derated. If the direction of travel is toward the ramp, the control electronics then determine whether the deceleration current required to decelerate the transducer will exceed a predetermined current for the tracks over which the seek is occurring. If the deceleration current will not exceed the predetermined current, the seek velocity profile is not derated. If the deceleration current will exceed the predetermined current, the control electronics then determine the distance from the target track to the maximum track. If the distance is greater than a predefined distance, the seek velocity profile is not derated. If the distance is less than the predefined distance, the control electronics then compute a derating factor to apply to the seek velocity profile. The derating factor is a variable factor which is dependant upon the distance from the target track to the maximum track. The derating factor is used by the control electronics to derate the seek velocity profile.

In yet another embodiment, the system uses an asymmetric seek velocity profile which employs a variable derate factor and a warping factor to derate certain seeks which are seeking toward the ramp. In this embodiment, if the seek is toward the ramp, with a deceleration current above the predetermined current for at least one track over which the seek is occurring, and the target track within the predefined distance of the maximum track, the control electronics determine the distance from the target track to the maximum track. The control electronics also determine the derating factor based on the distance from the target track to the maximum track, and a warping factor. The warping factor is determined based upon the seek length and the velocity of the transducer. After calculating the derating factor and warping factor, each are applied to the seek velocity profile to derate the seek velocity profile.

Based on the foregoing summary, a number of advantageous features of the present invention are noted. The velocity at which a transducer is allowed to travel is limited only when the transducer is seeking toward the ramp. Thus, average seek time is reduced compared to systems which limit transducer velocity on all seeks. Additionally, average seek time can be further reduced by limiting transducer velocity when the target track is within a predetermined distance of the maximum track by employing variable seek velocity profiles. Furthermore, average seek time can be reduced by using warping in conjunction with the seek velocity profiles.

Additional advantages of the present invention will become apparent from the following discussion, particularly when taken together with the accompanying drawings.

DETAILED DESCRIPTION

Figure 3:
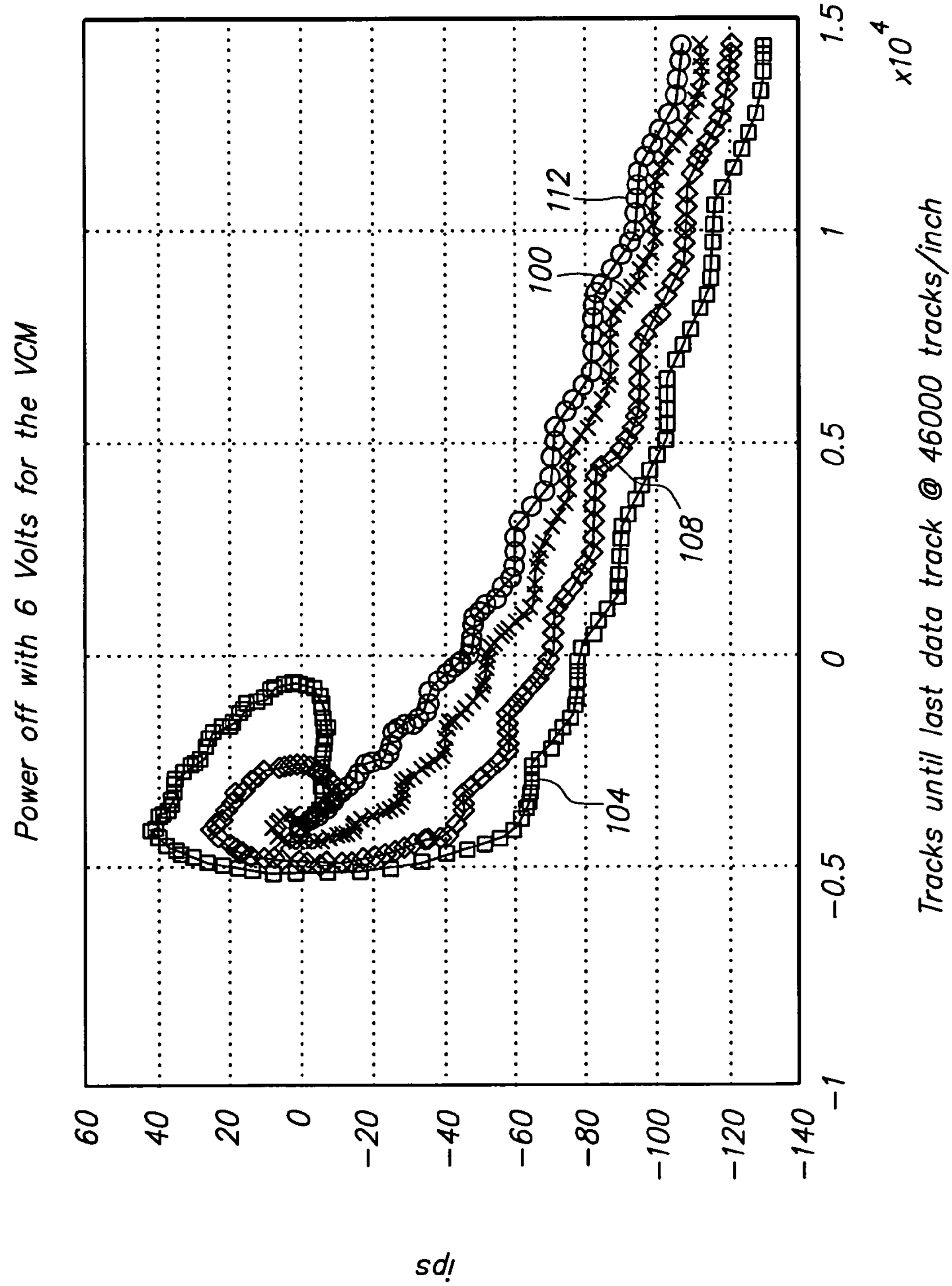
FIG. 3 is a plot illustrating several examples of seek velocity trajectories.

Referring to FIG. 3, a phase plane plot of deceleration trajectories is illustrated. The X-axis represents the number of tracks until the last, or maximum, data track. The term maximum data track is defined as the track closest to the ramp. However, it should be understood that this is an arbitrary reference and that, in certain embodiments, the track closest to the ramp may not actually be the track having the maximum track number as that number is defined in a particular disk drive. In the example of FIG. 3, there are 46,000 tracks per inch, although it will be understood that the number of tracks per inch can be increased or decreased from this number. The ramp in this embodiment is located beyond the maximum data track, with the crash stop located further beyond the maximum data track. In the example of FIG. 3, the crash stop is located approximately 0.09 inches beyond the maximum data track, or the equivalent of approximately 4000 tracks beyond the maximum data track. It should be understood that the crash stop may be located at other distances beyond the maximum data track. The Y-axis of FIG. 3 represents transducer velocity in inches per second (ips) measured relative to the ramp, with velocity toward the ramp being negative and velocity away from the ramp being positive.

FIG. 3 illustrates examples of four trajectory lines, a reference trajectory 100, a first trajectory line 104, a second trajectory line 108, and a third trajectory line 112. Each trajectory line 100, 104, 108, 112, represents the trajectory that a transducer will follow if the transducer is traveling at a given velocity at a given track when power is lost to the disk drive, and the BEMF from the spindle motor is used to decelerate the transducer. For example, referring to the reference trajectory 100, if the transducer is traveling at a velocity of approximately −100 ips at approximately 10,000 data tracks until the maximum track, the spindle motor BEMF will decelerate the transducer to approximately −50 ips when the transducer passes the maximum track, and the transducer slows to a rest close to the crash stop without achieving a substantial positive velocity.

As described above in the background of the invention, if the transducer has a relatively high velocity, and the disk drive loses power, the ramp tab located at the end of the actuator arm may bounce off of the crash stop resulting in the transducer reloading onto the disk surface at a high speed. In the example of FIG. 3, such a situation is represented by the first and second trajectory lines 104, 108. With reference to the first trajectory line 104, it can be seen that the magnitude of the transducer velocity is relatively high, compared to the reference line 100, when the transducer reaches the maximum track. The transducer then decelerates to approximately −60 ips when the ramp tab contacts the crash stop. At this point, the transducer velocity drops sharply and then increases sharply to a positive velocity of approximately 40 ips, and the transducer moves back toward the disk surface. In such a situation, the transducer may move back over the data containing portion of the disk, and potentially result in the data loss and transducer damage as described above. The second trajectory line 108 shows a similar occurrence, while the third trajectory line 112 shows a transducer velocity similar to that of the reference line 100. Thus, the reference line 100 represents the maximum safe velocity a transducer may have if the disk drive power were to fail. If the magnitude of the transducer velocity is greater than the magnitude indicated by reference line 100, the deceleration current available from the spindle motor BEMF may not decelerate the transducer enough to prevent the ramp tab from bouncing off of the crash stop, and/or causing mechanical damage to the crash stop or ramp tab.

The plot shown in FIG. 3 assumes that 6 volts are available from the spindle motor BEMF to decelerate the transducer, and that the ramp and crash stop can absorb up to approximately 30 ips of transducer speed. As will be understood by those of skill in the art, the magnitude of the maximum safe velocity, and thus the position of the reference line 100, changes depending upon the characteristics of a particular disk drive. For example, the reference line would change if more or less spindle motor BEMF were available to decelerate the transducer, or if the ramp and crash stop could absorb more or less than 30 ips of transducer velocity. Additionally, the model would change if the number of tracks per inch were adjusted. The plots of FIG. 3 are examples of one such situation, and are illustrated for purposes of discussion, without intending to limit the invention to the particular examples shown in the plots.

As can be seen with reference to FIG. 3, when seeking toward the ramp, it is important to limit the velocity that the transducer is allowed to achieve, such that the spindle motor BEMF will provide enough deceleration current to avoid the ramp tab bouncing off of the crash stop in the event of a power loss to the disk drive. However, limiting the velocity at which the transducer is allowed to travel has a negative impact on average seek time, thus it is beneficial to keep the transducer velocity close to the maximum safe velocity as represented by the reference line 100, while also ensuring that the ramp tab will not hit the crash stop at a high velocity. High velocity is defined as a velocity which may result in the ramp tab contacting the crash stop and causing damage to the disk drive, which can include mechanical damage to the disk drive components, or data loss.

Figure 4:
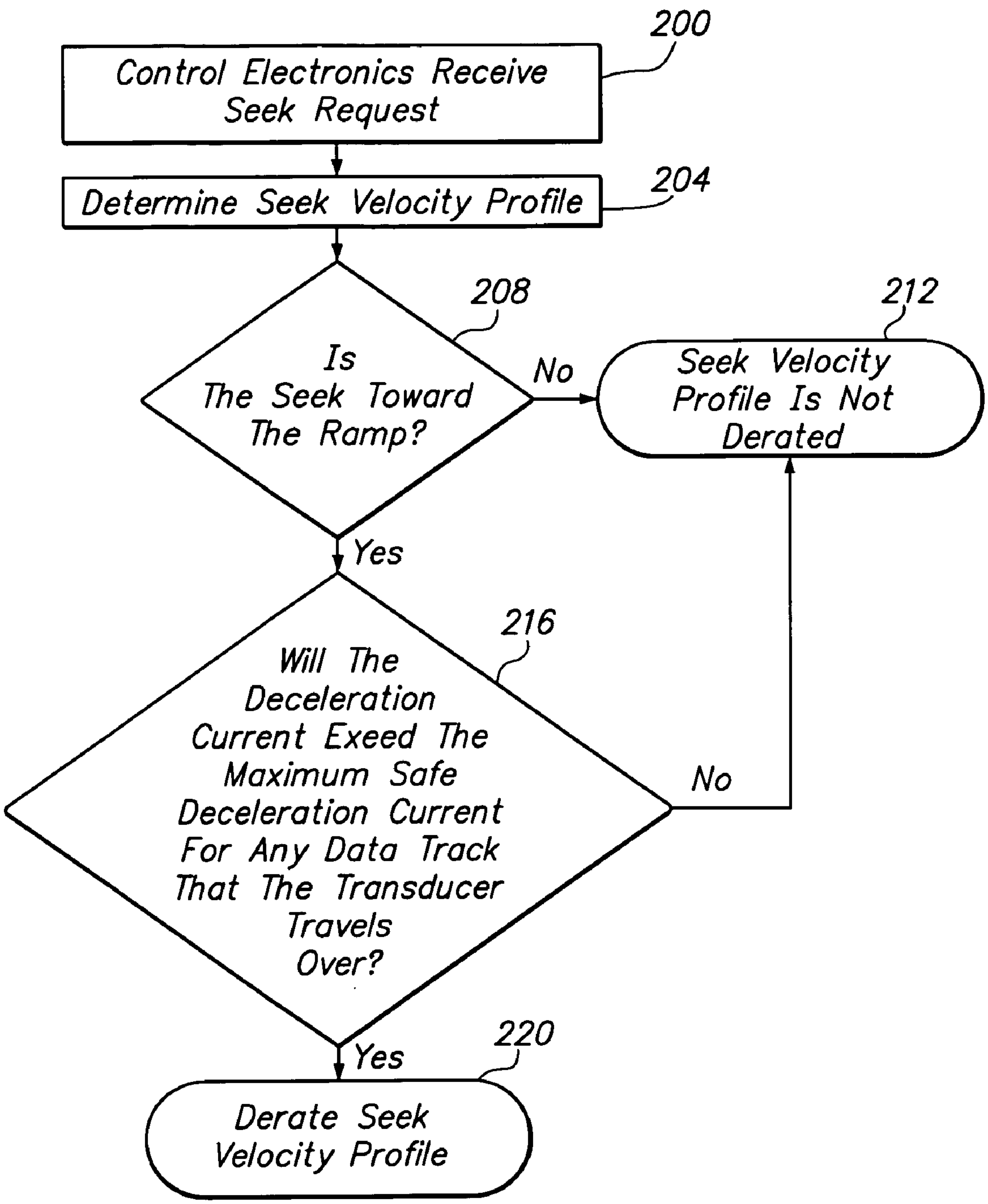
FIG. 4 is a flow chart illustrating operation of a first embodiment of the present invention.

In one embodiment of the present invention, an asymmetric seek velocity profile is used where the velocity at which the transducer is allowed to travel is limited only in certain instances where the transducer is seeking toward the ramp, and the velocity is not limited when the transducer is seeking away from the ramp. Referring now to FIG. 4, a flow chart representation of one embodiment of the present invention is now described. Initially, the control electronics within the disk drive receive a seek request, as indicated at block 200. The control electronics then at block 204 determine the seek velocity profile for the seek. The determination of the seek velocity profile is performed by traditional techniques, which are well known in the art. The seek velocity profile contains information regarding the velocity that the transducer will achieve during the seek relative to the tracks over which it travels during the seek, and information regarding the acceleration and deceleration of the transducer including the amount of deceleration current required for the deceleration portion. The control electronics then, according to block 208, determine whether the seek is toward the ramp, or away from the ramp. If the seek is away from the ramp, the control electronics do not derate the seek velocity profile, as indicated at block 212.

If the control electronics determine that the seek is toward the ramp, the control electronics then determine, at block 216, whether the amount of current required to decelerate the transducer during the deceleration portion of the seek velocity profile will exceed the maximum safe deceleration current for any data track that the transducer travels over. The maximum safe deceleration current is the amount of deceleration current required to decelerate a transducer traveling at the velocity represented by the reference line 100, and as described above with respect to FIG. 3. Thus, in this embodiment, the control electronics determine the appropriate seek velocity profile, and compare the deceleration current required for the deceleration portion of the profile to the maximum safe deceleration current for the tracks over which the transducer will travel. If the deceleration current from the seek velocity profile does not exceed the maximum safe deceleration current, the control electronics do not derate the seek velocity profile, according to block 212. In other words, if the magnitude of the velocity does not exceed the maximum safe velocity as described above with respect to FIG. 3 for any of the data tracks that the transducer travels over, the control electronics do not limit the velocity at which the transducer is allowed to travel. It is common that a seek length of roughly one-third of a full stroke will result in a transducer velocity greater than the maximum safe velocity. That is, if the difference between the starting track and the target track is greater than approximately one-third of the total tracks available on the disk, the transducer may exceed this maximum safe velocity.

If the control electronics determine that the deceleration current will exceed the maximum safe deceleration current for any of the data tracks that the transducer will travel over, the control electronics then, at block 220 derate the seek velocity profile. In this case, the control electronics act to limit the amount of current required to decelerate the transducer and, thus, ensure that the magnitude of the velocity of the transducer is not greater than the maximum safe velocity of the reference line 100 of FIG. 3. In one embodiment, the seek velocity profile is derated by 50%, or a derate factor of 0.5, meaning that the current which is used to decelerate the transducer in such a situation is 50% of the maximum available deceleration current. It should be understood that this derate factor is described for purposes of discussion only, and other derate factors may be more appropriate, depending upon several factors within the disk driver including the target track, power supply voltage, temperature, spindle motor, BEMF, and positioner gain present in the control electronics which provide current to the VCM. For example, if the available spindle motor BEMF voltage were greater than 6 Volts, the derate factor may be a higher number such as 0.65, allowing the transducer to decelerate using 65% of the maximum available decleration current.

Figure 1:
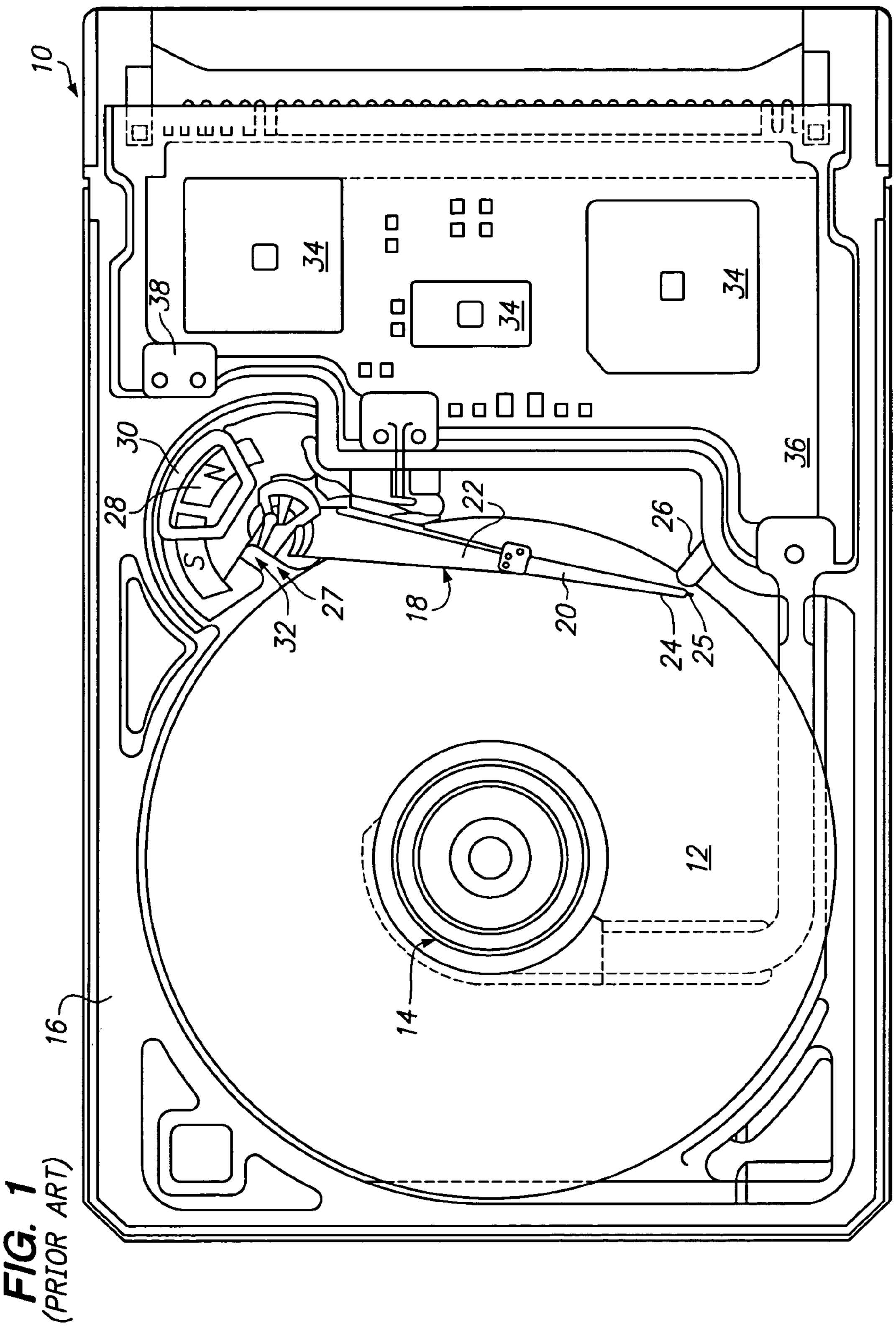
FIG. 1 is a diagrammatic representation illustrating a disk drive system having a ramp.
Figure 2:
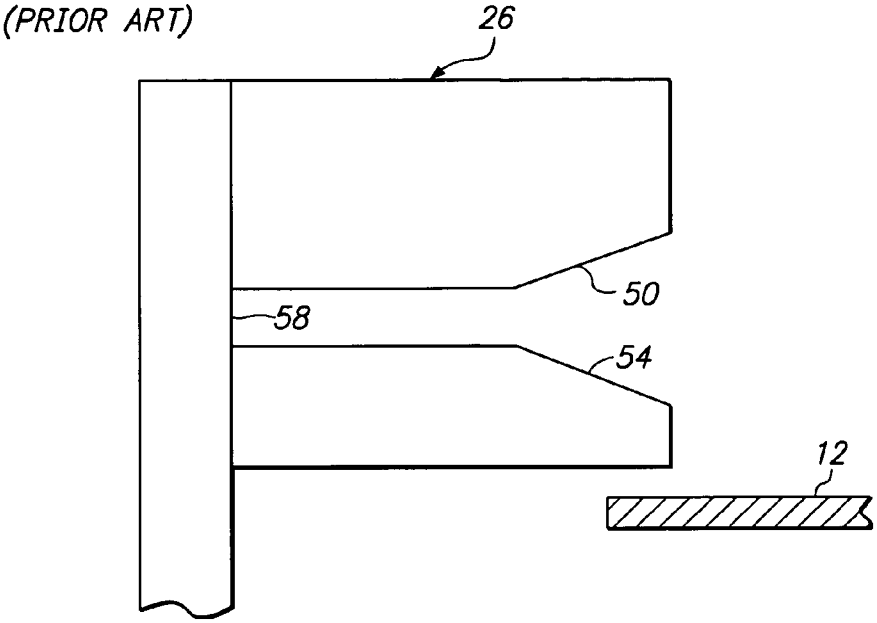
FIG. 2 is a diagrammatic representation illustrating a side view of a ramp which may be used in a disk drive.
Figure 5:
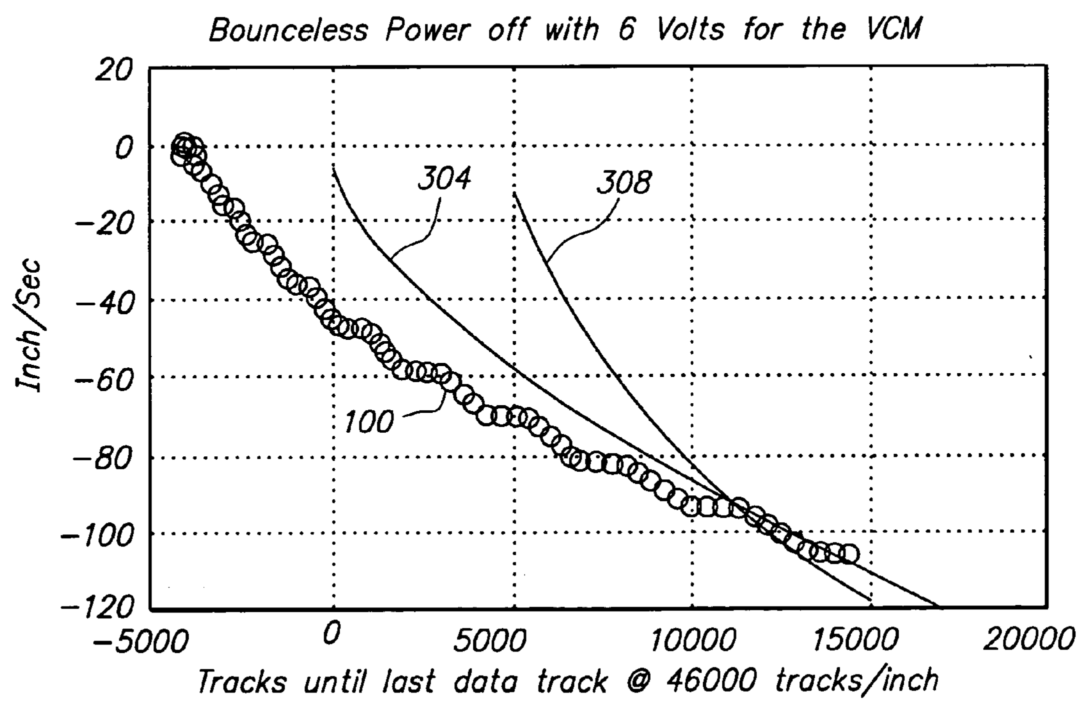
FIG. 5 is a plot illustrating examples of seek velocity trajectories resulting from the first embodiment of the present invention.

Referring now to FIG. 5, seek profile plots for the embodiment described with respect to FIG. 4 are illustrated. As represented by line 304, when the seek velocity profile is derated, the velocity of the transducer remains at a lower magnitude than the maximum allowable velocity as indicated by the reference line 100. Likewise, if the target track is greater than the predetermined distance from the maximum track, in this embodiment about 5000 tracks from the maximum track, the seek profile is not derated and is represented by line 308.

Figure 6:
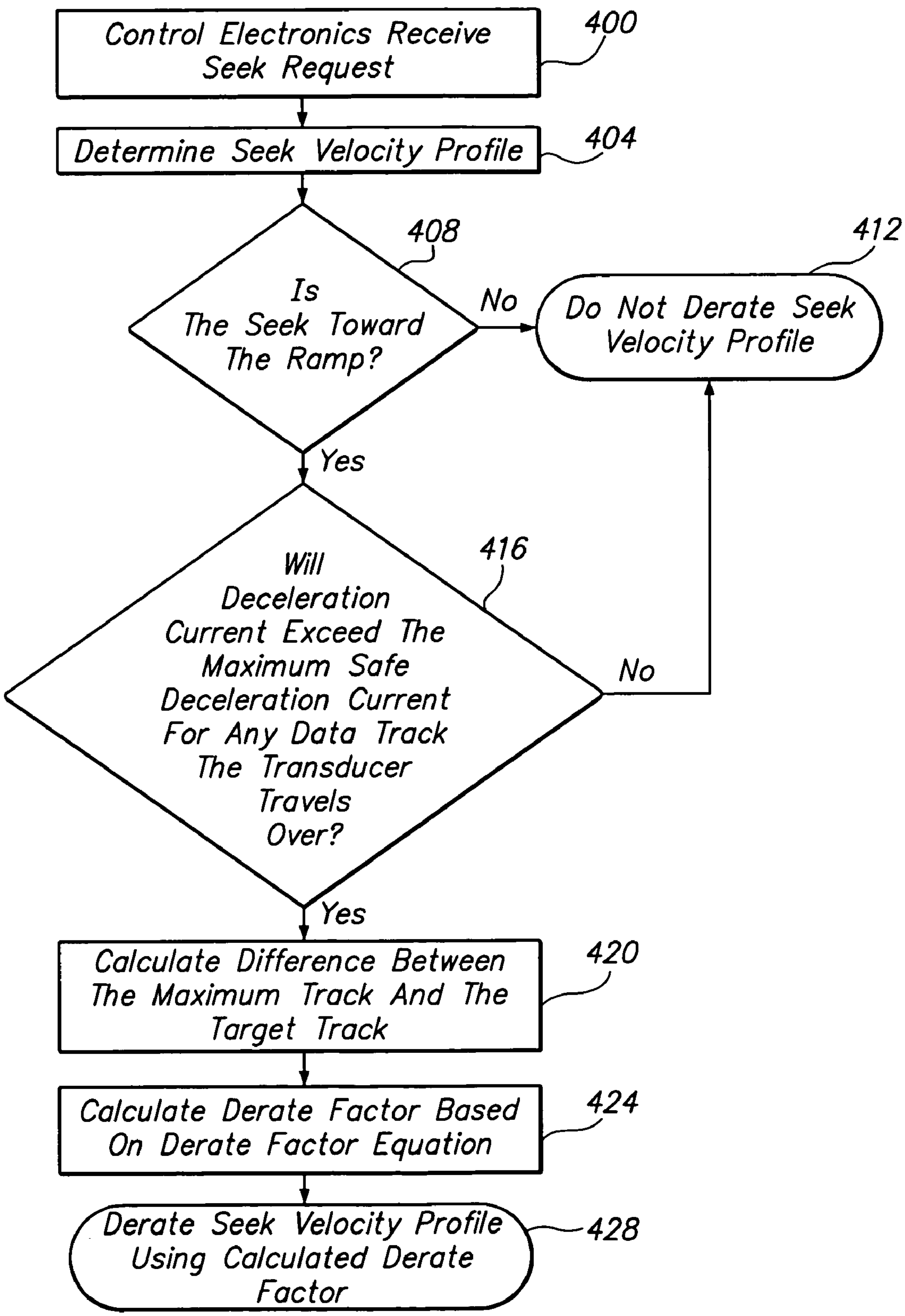
FIG. 6 is a flow chart illustrating the operation of a second embodiment of the present invention.

Referring to the flow chart representation of FIG. 6, another embodiment of the present invention is now described. In this embodiment, the derating factor used to limit the velocity of the transducer is varied depending upon a number of factors, resulting in increased transducer velocities (and, thus, reduced average seek times) in certain situations as compared to the embodiment of FIG. 4. According to FIG. 6, initially the control electronics receive a seek request, as indicated by block 400. The control electronics then at block 404 determine the seek velocity profile for the seek request. Next, at block 408, the control electronics determine whether the seek is toward the ramp, or away from the ramp. If the seek is away from the ramp, the control electronics do not derate the seek velocity profile, as indicated at block 412. If the control electronics determine that the seek is toward the ramp, the control electronics then determine, at block 416, whether the deceleration current will exceed the maximum safe deceleration current at any point during the seek. As described above, the maximum safe deceleration current is the current required to decelerate a transducer traveling at the velocity represented by the reference line 100, and as described above with respect to FIG. 3. If the deceleration current will not exceed the maximum safe deceleration current, the seek velocity profile is not derated, according to block 412.

If the control electronics determine that the deceleration current will exceed the maximum safe deceleration current, the control electronics then, at block 420, calculate the difference between the maximum track and the target track. The control electronics then use this calculated difference to calculate a variable derate factor based on a derate factor equation, as indicated at block 424. In this embodiment, the variable derate factor is calculated according to the following formula:

$$\text{Derate\_factor} = \frac{(\text{max\_track} - \text{tgt\_track})^2 \times 127}{2^{26} \times \sqrt{2a}} + 0.5$$

where max_track is the number of the maximum track, which is the track closest to the ramp in the embodiment described, tgt_track is the target track, and a is the deceleration of the actuator arm. This formula is based on a model from one type of disk drive. It should be understood that this is an example only, and the determination of a derate factor would depend upon several factors present in a disk drive, such as the spindle motor BEMF available for decelerating the transducer, the amount of energy the crash stop can absorb, the friction present in the actuator arm assembly, power supply voltage, temperature, positioner gain, and other factors affecting the movement of the actuator arm, as will be understood by those of skill in the art. Additionally, max_track may be the number of a track on the inner diameter of the disk surface for disk drives having an inner diameter ramp, or may be the number of a track on the outer diameter of the disk surface for disk drives having an outer diameter ramp. Likewise, max_track may also be the number of an arbitrary track, with the derate factor equation appropriately adjusted. Once the derate factor is calculated, the control electronics then derate the seek velocity profile using the calculated derate factor, as indicated at block 428.

Figure 7:
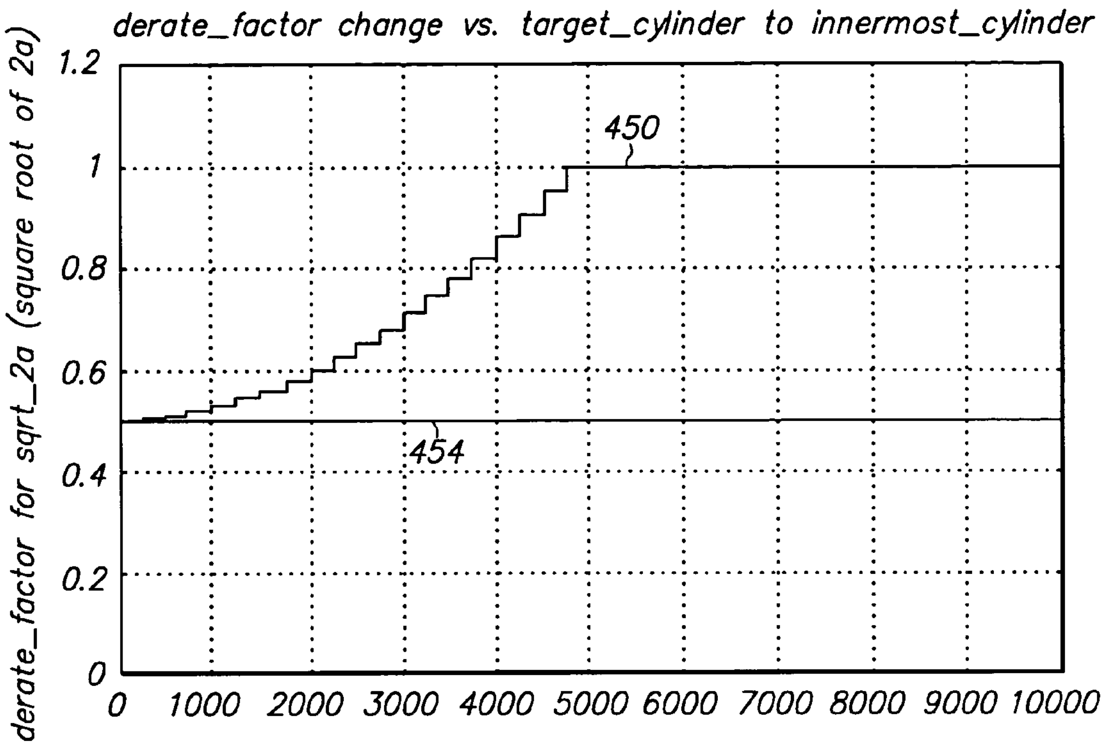
FIG. 7 is a plot illustrating an example of the variable derate factor resulting from the second embodiment of the present invention.

FIG. 7 illustrates the derate factor of the embodiment of FIG. 6 that will be applied in graphical format. As can be seen from the graph, the variable derate factor, represented by line 450 is 0.5 if the difference between the target track and the maximum track is zero. The variable derate factor increases to 1.0 at difference of approximately 4800 tracks. Thus, if the difference between the target track and the maximum track is greater than approximately 4800 tracks, the seek velocity profile is not derated at all, even when the seek is towards the ramp. A flat derate factor of 0.5, as described above, is represented by line 454, and is illustrated for purposes of comparison to the variable derate factor.

Figure 8:
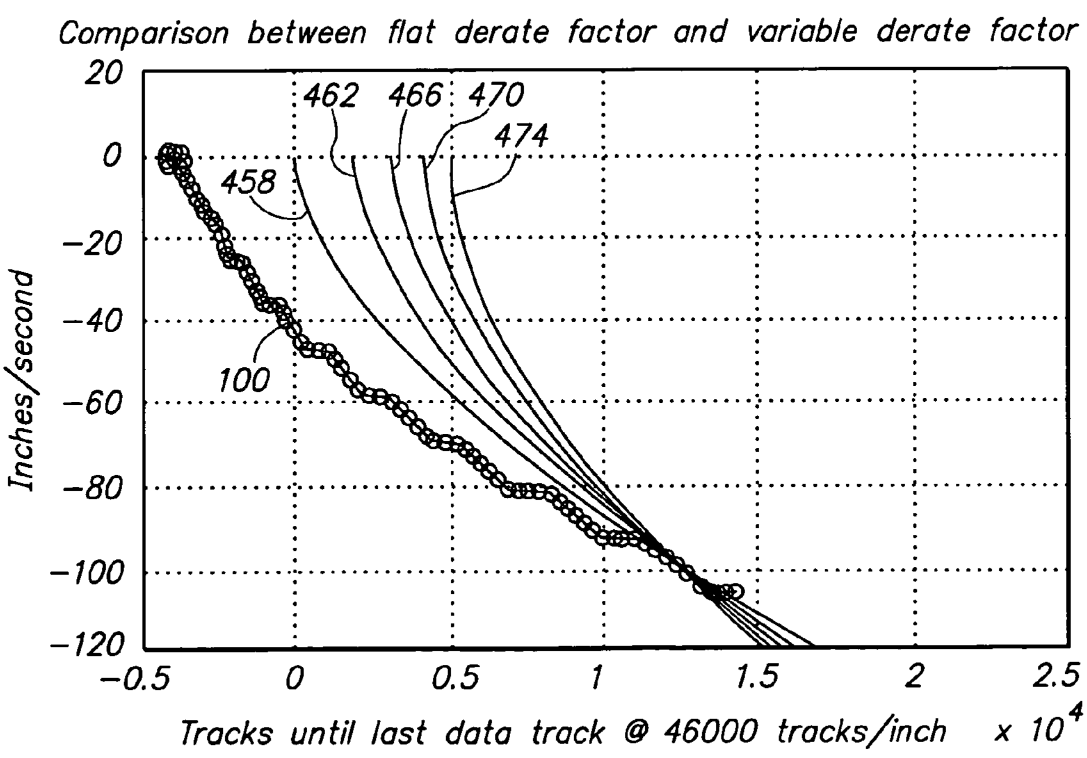
FIG. 8 is a plot illustrating examples of seek velocity trajectories resulting from the second embodiment of the present invention.

FIG. 8, illustrates the resulting trajectories for several target tracks, and the maximum safe trajectory 100. As represented in FIG. 8, the velocity profile for a derate factor of 0.5 is illustrated by line 458. A velocity profile for a derate factor of 0.625 is illustrated by line 462. A velocity profile for a derate factor of 0.75 is illustrated by line 466, and a velocity profile for a derate factor of 0.875 is illustrated by line 470. Line 474 represents a derate factor of 1.0, or no derating. As can be seen, the resulting seek profiles result in higher transducer velocities as the target track moves away from the ramp, and thus work to enhance the average seek time of the disk drive.

Figure 9:
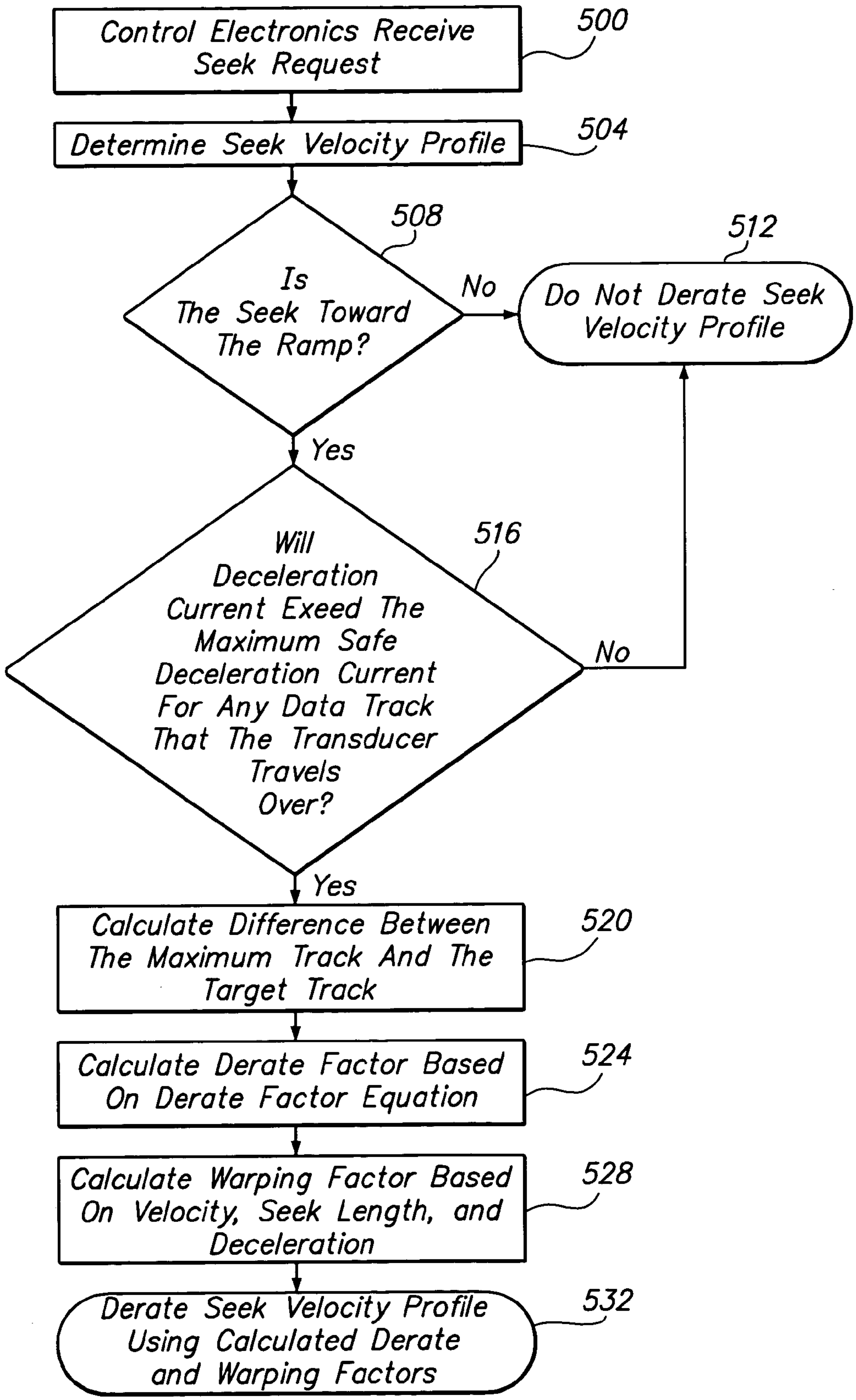
FIG. 9 is a flow chart illustrating the operation of a third embodiment of the present invention.

In yet another embodiment, the seek velocity profile is further modified by warping the seek velocity profile. Warping the seek velocity profile, along with the variable derate factor as described above, results in transducer velocities which are further increased as compared to the embodiment described in FIG. 4. FIG. 9 is a flow chart representation of this embodiment.

As depicted in FIG. 9, initially, the control electronics receive a seek request, as indicated at block 500. The control electronics then, at block 504, determine the seek velocity profile for the seek request. Next, according to block 508, the control electronics determine whether the seek is toward the ramp or away from the ramp. If the seek is away from the ramp, the control electronics do not derate the seek velocity profile, as indicated at block 512. If the control electronics determine that the seek is toward the ramp, the control electronics then determine whether the deceleration current will exceed the maximum safe deceleration current for any data track that the transducer travels over during the seek, as indicated at block 516. As described above, the maximum safe deceleration current for a particular data track is the current required to decelerate a transducer traveling at a velocity represented by the reference line 100 of FIG. 3. If the deceleration current is not greater than the maximum safe velocity, the seek velocity profile is not derated, according to block 512.

If the control electronics determine that the deceleration current will be greater than the maximum safe deceleration current, the control electronics then calculate the difference between the maximum track and the target track, as indicated at block 520. The control electronics then calculate the derate factor based on the derate factor equation as described above and indicated at block 524.

The control electronics then use this calculated difference to calculate a warping derate velocity based on velocity, seek length and deceleration, as indicated at block 528. In this embodiment, the maximum velocity the transducer is allowed to achieve is determined based on the following equation:

$$Vel=\sqrt{2a}\times\sqrt{(1+Kwarp\times Vel)\times xtg}$$

where a is the deceleration of the transducer, Vel is the velocity of the transducer, xtg is the seek length, and Kwarp is the warping factor. The warping factor is determined by the amount of back electromotive force available from the VCM which can be applied to slow the transducer during the deceleration portion of the seek velocity profile. The application of VCM BEMF to help decelerate the transducer is common and well known in the art. In this embodiment, a warping factor of less than zero is used and factored into the derating of the seek velocity profile. Once the warping factor is determined, the control electronics derate the seek velocity profile using the calculated derate and warping factors, as indicated at block 532.

Figure 10:
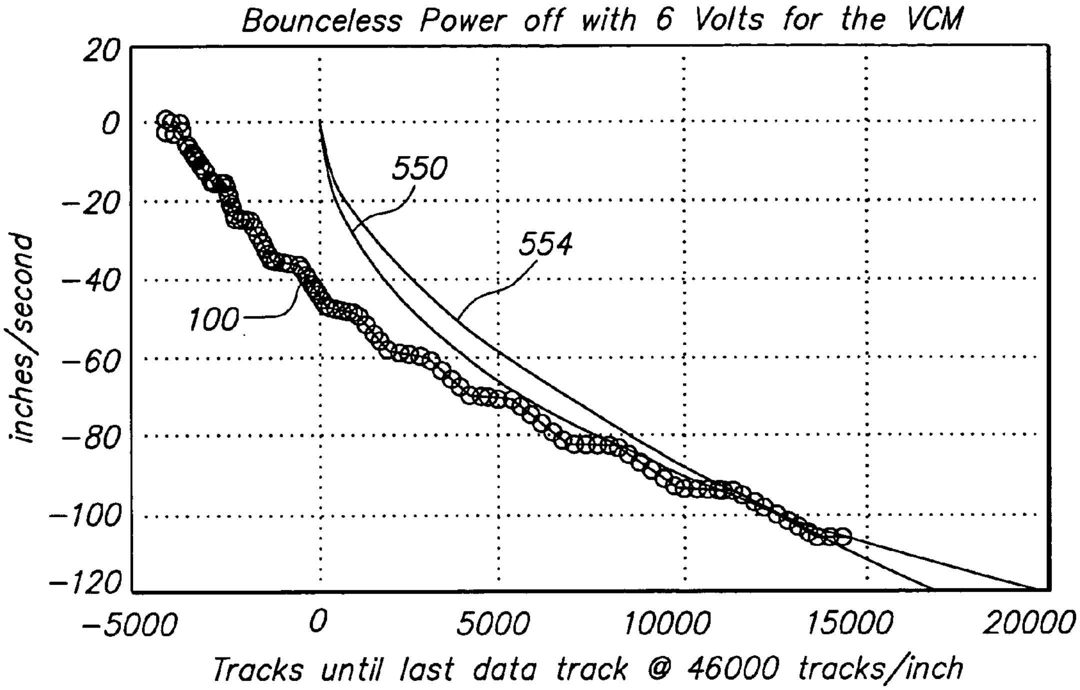
FIG. 10 is a plot illustrating examples of seek velocity trajectories resulting from the third embodiment of the present invention.
Figure 11:
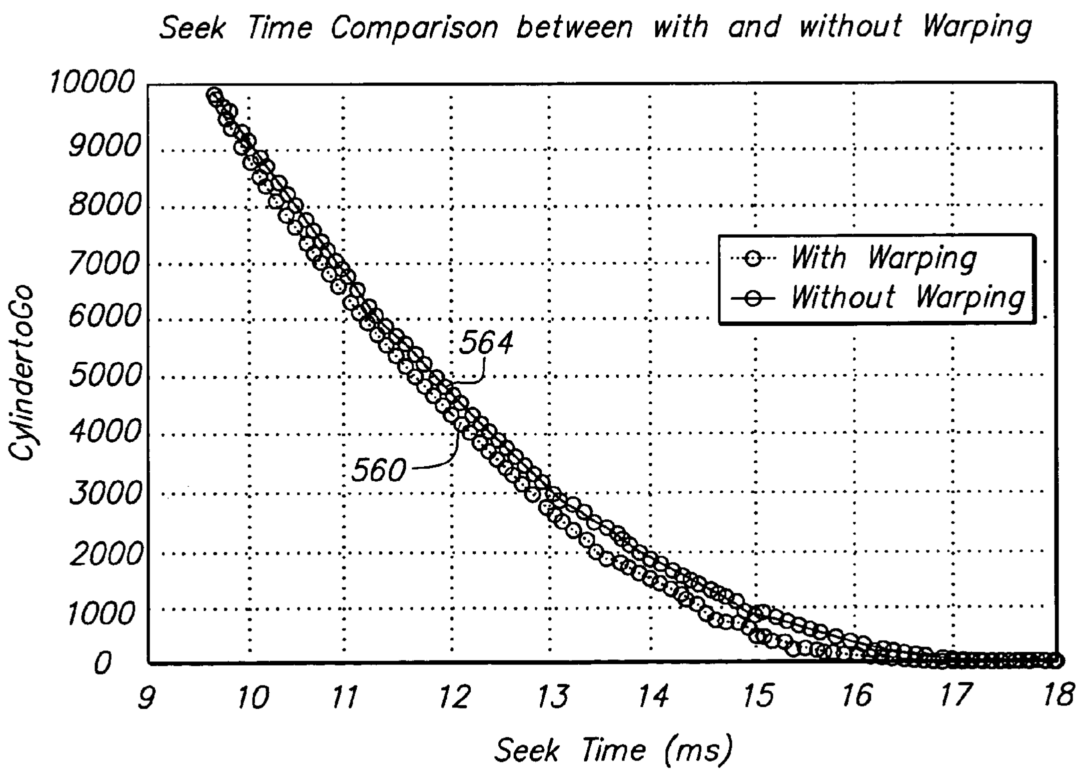
FIG. 11 is a plot illustrating examples of seek times resulting from the second and third embodiments.

Referring now to FIG. 10, a plot of seek velocity profiles is illustrated to compare the deceleration of the transducer using warping and no warping. As illustrated in FIG. 10, the maximum safe trajectory is represented by line 100. The deceleration trajectory of a transducer using the warping factor is represented by line 550. The deceleration trajectory of a transducer without any warping is represented by line 554. Referring now to FIG. 11, a plot of seek times is illustrated using this embodiment. The X-axis represents the seek time, and the Y-axis represents the number of tracks until the maximum track, at 46,000 tracks per inch. A warping seek time plot is represented by line 560, and a no warping seek time plot is represented by line 564. As can be seen from the plot, when variable derate factors with warping is used, the average seek time is reduced as compared to variable derate factors without warping. For this embodiment, when seeking to tracks within about 1,000 tracks of the maximum track, the seek time using warping is reduced by up to approximately 1 ms which, as will be appreciated by those of skill in the art, is a significant reduction in seek time.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for determining transducer velocity profiles in a disk drive, for use during normal non-park operations, comprising:

determining a first transducer velocity profile in a first direction away from a park position;

determining a second transducer velocity profile in a second direction, wherein said second direction is a direction towards said park position;

adjusting said second transducer velocity profile, without the need to adjust said first transducer velocity profile, wherein said second transducer velocity profile is adjusted such that a ramp tab does not hit a crash stop at a velocity which might cause mechanical damage to said disk drive when said disk drive loses power during operation while a seek is in progress.

2. A method, as claimed in claim 1, wherein said adjusting step includes:

adjusting a current of a deceleration portion of said second transducer velocity profile in an amount sufficient such that current available from a back electromotive force of a spindle motor will decelerate said transducer in an amount sufficient such that said ramp tab does not bounce off of said crash stop and back over a rotating storage medium when said disk loses power while a seek is in progress.

3. A method, as claimed in claim 1, wherein said mechanical damage includes:

damage to a surface of a rotating storage medium which might result in loss of data stored on said rotating storage medium.

4. A method, as claimed in claim 1, wherein said mechanical damage includes:

damage to said crash stop or damage to said ramp tab.

5. A method, as claimed in claim 1, wherein said adjusting step includes:

adjusting a current of a deceleration portion of said second transducer velocity profile by a predetermined amount.

6. A method, as claimed in claim 5, wherein said predetermined amount is approximately 50 percent.

7. A method, as claimed in claim 1, wherein said adjusting step includes:

adjusting said second transducer velocity profile by a variable amount.

8. A method, as claimed in claim 7, wherein said adjusting step includes:

calculating said variable amount based on at least one of a target track, power supply voltage, temperature, spindle motor back electromotive force, and positioner gain.

9. A method, as claimed in claim 8, wherein:

said adjusting step further includes calculating a warping factor and applying said warping factor to said second transducer velocity profile.

10. A method, as claimed in claim 9, wherein:

said warping factor is determined based on at least one of a seek length, a transducer velocity, and a voice coil motor back electromotive force.

11. A method for determining transducer velocity profiles in a disk drive, comprising:

determining a first transducer velocity profile in a first direction;

determining a second transducer velocity profile in a second direction;

adjusting said second transducer velocity profile in an amount sufficient such that a ramp tab does not hit a crash stop at a velocity which might cause mechanical damage to said disk drive when said disk drive loses power during operation while a seek is in progress;

wherein said adjusting step includes adjusting said second transducer velocity profile by a variable amount, wherein said variable amount is a derate factor calculated using the equation:

$$\text{Derate\_factor} = \frac{(\text{max\_track} - \text{tgt\_track})^2 \times 127}{2^{26} \times \sqrt{2a}} + 0.5$$

where max_track is the number of the maximum track, tgt_track is the number of the target track, and a is the deceleration of the transducer according to said deceleration portion of said velocity profile.

12. A method for determining transducer velocity profiles in a disk drive, comprising:

determining a first transducer velocity profile in a first direction;

determining a second transducer velocity profile in a second direction;

adjusting said second transducer velocity profile in an amount sufficient such that a ramp tab does not hit a crash stop at a velocity which might cause mechanical damage to said disk drive when said disk drive loses power during operation while a seek is in progress;

wherein said adjusting step includes adjusting said second transducer velocity profile by a variable amount, wherein said adjusting step includes calculating said variable amount based on at least one of a target track, power supply voltage, temperature, spindle motor back electromotive force, and positioner gain, wherein said adjusting step further includes calculating a warping factor and applying said warping factor to said second transducer velocity profile, wherein said warping factor is determined based on at least one of a seek length, a transducer velocity, and a voice coil motor back electromotive force, and wherein said warping factor is determined according to the following equation:

$$Warp\_factor = \sqrt{2a} \times \sqrt{(1 + Kwarp \times Vel) \times xtg}$$

where a is the deceleration of said transducer according to a deceleration portion of said seek velocity profile, vel is the velocity of the transducer, xtg is said seek length, and kwarp is a variable determined by the amount of said voice coil motor back electromotive force.

13. A disk drive, comprising:

a storage disk having a plurality of concentric tracks for storing data;

a spindle motor for rotating said storage disk;

an actuator arm assembly having a transducer for reading data from said storage disk and having a ramp tab;

a ramp operable to engage said ramp tab and prevent said transducer from contacting said storage disk when said storage disk is not rotating, said ramp having a crash stop located at a distal end of said ramp;

a voice coil motor operable to move said actuator arm relative to said storage disk from a starting track to a target track according to a first velocity profile in a first direction toward said ramp and a second velocity profile in a second direction away from said ramp in response to a control signal; and a controller operable to generate said control signal and deliver said control signal to said voice coil motor such that said first velocity profile is limited, during normal non-park operations, without the need to limit said second velocity profile, such that said ramp tab does not hit said crash stop at a velocity which might cause mechanical damage to said disk drive when said disk drive loses power while a seek is in progress.

14. The disk drive, as claimed in claim 13, wherein said mechanical damage includes:

damage to a surface of said storage disk which might result in loss of data stored on said disk.

15. The disk drive, as claimed in claim 13, wherein said mechanical damage includes:

damage to said crash stop or damage to said ramp tab.

16. The disk drive, as claimed in claim 13, wherein:

a current required for a deceleration portion of said first velocity profile is derated by a factor of approximately 0.5.

17. The disk drive, as claimed in claim 13, wherein:

said first velocity profile is derated by a variable amount.

18. The disk drive, as claimed in claim 17, wherein:

said variable amount is determined according to at least one of said target track, a power supply voltage, a temperature, a spindle motor back electromotive force, and a positioner gain.

19. A disk drive, comprising:

a storage disk having a plurality of concentric tracks for storing data;

a spindle motor for rotating said storage disk;

an actuator arm assembly having a transducer for reading data from said storage disk and having a ramp tab;

a ramp operable to engage said ramp tab and prevent said transducer from contacting said storage disk when said storage disk is not rotating, said ramp having a crash stop located at a distal end of said ramp;

a voice coil motor operable to move said actuator arm relative to said storage disk from a starting track to a target track according to a first velocity profile in a first direction toward said ramp and a second velocity profile in a second direction away from said ramp in response to a control signal; and a controller operable to generate said control signal and deliver said control signal to said voice coil motor such that said first velocity profile is limited such that said ramp tab does not hit said crash stop at a velocity which might cause mechanical damage to said disk drive when said disk drive loses power while a seek is in progress, wherein said first velocity profile is derated by a variable amount, wherein said variable amount is determined according to at least one of said target track, a power supply voltage, a temperature, a spindle motor back electromotive force, and a positioner gain, and wherein said variable amount is calculated according to the equation:

$$\text{Derate\_factor} = \frac{(\text{max\_track} - \text{tgt\_track})^2 \times 127}{2^{26} \times \sqrt{2a}} + 0.5$$

where max_track is the number of a track with a predefined relationship to said ramp, tgt_track is the number of the target track, and a is the deceleration of said transducer.

20. A disk drive, as claimed in claim 19 wherein said first velocity profile is further limited according to the following equation:

$$Warp\_factor = \sqrt{2a} \times \sqrt{(1 + Kwarp \times Vel) \times xtg}$$

where a is the deceleration of said transducer, Vel is the velocity of said transducer, xtg is the distance from said starting track to said target track, and kwarp is a variable determined by an amount of back electromotive force available from said voice coil motor during deceleration of said actuator arm.

21. A method for changing radial position of a transducer relative to a rotating storage medium from a starting track to a target track, comprising:

determining a desired velocity profile for said transducer as a function of radial position of said transducer, said velocity profile including at least an acceleration portion and a deceleration portion;

adjusting at least said deceleration portion of said velocity profile based on at least a direction of travel of said transducer; and moving said transducer from said starting track to said target track during normal non-park operations, in accordance with said velocity profile.

22. A method, as claimed in claim 21, wherein said adjusting step includes:

determining a direction of travel of said transducer from said target track to a maximum track; and derating at least said deceleration portion of said velocity profile when said direction of travel is toward said maximum track.

23. A method, as claimed in claim 22, wherein:

said maximum track is located near an inner diameter of said rotating storage medium.

24. A method, as claimed in claim 22, wherein:

said maximum track is located near an outer diameter of said rotating storage medium.

25. A method, as claimed in claim 21, wherein said adjusting step includes:

determining a first distance from said target track to a maximum track;

determining a velocity that said transducer will achieve;

determining a direction of travel of said transducer; and derating said velocity profile when said first distance is less than a first predetermined number, said velocity is greater than a maximum safe velocity, and said direction of travel is toward said maximum track.

26. A method, as claimed in claim 25, wherein:

said derating step includes adjusting at least said deceleration portion by a predetermined amount.

27. A method, as claimed in claim 26, wherein:

said predetermined amount is 50 percent of a current available for said deceleration portion.

28. A method, as claimed in claim 25, wherein:

said derating step includes adjusting at least said deceleration portion by a variable amount.

29. A method, as claimed in claim 28, wherein said variable amount is determined according to at least one of said target track, a power supply voltage, a temperature, a spindle motor back electromotive force, and a positioner gain.

30. A method, as claimed in claim 29, wherein:

said derating step further includes calculating a warping factor and applying said warping factor to said velocity profile.

31. A method, as claimed in claim 30, wherein:

said warping factor is determined based on at least one of said first distance and a back electromotive force of a voice coil motor during said deceleration portion.

32. A method for changing radial position of a transducer relative to a rotating storage medium from a starting track to a target track, comprising:

determining a desired velocity profile for said transducer as a function of radial position of said transducer, said velocity profile including at least an acceleration portion and a deceleration portion;

adjusting at least said deceleration portion of said velocity profile based on at least a direction of travel of said transducer; and moving said transducer from said starting track to said target track in accordance with said velocity profile, wherein said adjusting step includes:

determining a first distance from said target track to a maximum track;

determining a velocity that said transducer will achieve;

determining a direction of travel of said transducer; and derating said velocity profile when said first distance is less than a first predetermined number, said velocity is greater than a maximum safe velocity, and said direction of travel is toward said maximum track, wherein said derating step includes adjusting at least said deceleration portion by a variable amount, wherein said variable amount is determined according to at least one of said target track, a power supply voltage, a temperature, a spindle motor back electromotive force, and a positioner gain, and wherein said variable amount is a derate factor determined by the equation:

$$\text{Derate\_factor} = \frac{(\text{max\_track} - \text{tgt\_track})^2 \times 127}{2^{26} \times \sqrt{2a}} + 0.5$$

where max_track is the number of the maximum track, tgt_track is the number of the target track, and a is the deceleration of the transducer according to said deceleration portion of said seek velocity profile.

33. A method for changing radial position of a transducer relative to a rotating storage medium from a starting track to a target track, comprising:

determining a desired velocity profile for said transducer as a function of radial position of said transducer, said velocity profile including at least an acceleration portion and a deceleration portion;

adjusting at least said deceleration portion of said velocity profile based on at least a direction of travel of said transducer; and moving said transducer from said starting track to said target track in accordance with said velocity profile, wherein said adjusting step includes:

determining a first distance from said target track to a maximum track;

determining a velocity that said transducer will achieve;

determining a direction of travel of said transducer; and derating said velocity profile when said first distance is less than a first predetermined number, said velocity is greater than a maximum safe velocity, and said direction of travel is toward said maximum track, wherein said derating step includes adjusting at least said deceleration portion by a variable amount, wherein said variable amount is determined according to at least one of said target track, a power supply voltage, a temperature, a spindle motor back electromotive force, and a positioner gain, wherein said derating step further includes calculating a warping factor and applying said warping factor to said velocity profile, wherein said warping factor is determined based on at least one of said first distance and a back electromotive force of a voice coil motor during said deceleration portion, and wherein said warping factor is determined according to the following equation:

$$Warp\_factor=\sqrt{2a}\times\sqrt{(1+Kwarp\times Vel)\times xtg}$$

where a is the deceleration of said transducer according to said deceleration portion of said seek velocity profile, vel is the velocity of the transducer, xtg is the distance between said starting track and said target track, and kwarp is a variable determined by the amount of said back electromotive force.

34. A disk drive, comprising:

a storage disk having a plurality of concentric tracks for storing data including at least a first track located at an outer diameter of said storage disk and a second track located at an inner diameter of said storage disk;

a spindle motor for rotating said storage disk;

an actuator arm assembly having a transducer for reading data from said storage disk and a ramp tab;

a ramp operable to engage said ramp tab and prevent said transducer from contacting said storage disk when said storage disk is not rotating;

a voice coil motor operable to move said actuator arm relative to said disk in response to a control signal; and a controller operable to generate said control signal and deliver said control signal to said voice coil motor such that said actuator arm moves in a direction from a starting track to a target track according to a seek velocity profile for use during normal non-park operations, wherein said seek velocity profile includes at least an acceleration portion and a deceleration portion, and said seek velocity profile is derated based on at least a direction of travel of said actuator arm.

35. The disk drive, as claimed in claim 34, wherein:

at least said deceleration portion of said seek velocity profile is derated by a factor of 0.5 when said actuator arm moves toward said ramp and said target track is within a predefined distance from said ramp.

36. The disk drive, as claimed in claim 35, wherein:

at least said deceleration portion of said seek velocity profile is derated by a variable amount when said actuator arm moves toward said ramp and said target track is within a predefined distance from said ramp.

37. The disk drive, as claimed in claim 36, wherein:

said variable amount is determined based on at least one of said target track, a power supply voltage, a temperature, a spindle back electromotive force, and a positioner gain.

38. A disk drive, as claimed in claim 37, wherein said variable amount also includes a warping factor based on at least one of a seek length and a back electromotive force of said voice coil motor.

39. A disk drive, comprising:

a storage disk having a plurality of concentric tracks for storing data including at least a first track located at an outer diameter of said storage disk and a second track located at an inner diameter of said storage disk;

a spindle motor for rotating said storage disk;

an actuator arm assembly having a transducer for reading data from said storage disk and a ramp tab;

a ramp operable to engage said ramp tab and prevent said transducer from contacting said storage disk when said storage disk is not rotating;

a voice coil motor operable to move said actuator arm relative to said storage disk in response to a control signal; and a controller operable to generate said control signal and deliver said control signal to said voice coil motor such that said actuator arm moves in a direction from a starting track to a target track according to a seek velocity profile, wherein said seek velocity profile includes at least an acceleration portion and a deceleration portion, and said seek velocity profile is derated based on at least a direction of travel of said actuator arm, wherein at least said deceleration portion of said seek velocity profile is derated by a variable amount when said actuator arm moves toward said ramp and said target track is within a predefined distance from said ramp, wherein said variable amount is determined based on at least one of said target track, a power supply voltage, a temperature, a spindle back electromotive force, and a positioner gain, and wherein said variable amount is a derate factor determined by the equation:

$$\text{Derate\_factor} = \frac{(\text{max\_track} - \text{tgt\_track})^2 \times 127}{2^{26} \times \sqrt{2a}} + 0.5$$

where max_track is the number of a track with a predetermined relationship to said ramp, tgt_track is the number of the target track, and a is the deceleration of said transducer during said deceleration portion of said seek velocity profile.

40. The disk drive, as claimed in claim 39, wherein:

max_track is the number of said second track when said ramp is located at said inner diameter of said storage disk.

41. The disk drive, as claimed in claim 39, wherein:

max_track is the number of said first track when said ramp is located at said outer diameter of said storage disk.

42. A disk drive, comprising:

a storage disk having a plurality of concentric tracks for storing data including at least a first track located at an outer diameter of said storage disk and a second track located at an inner diameter of said storage disk;

a spindle motor for rotating said storage disk;

an actuator arm assembly having a transducer for reading data from said storage disk and a ramp tab;

a ramp operable to engage said ramp tab and prevent said transducer from contacting said storage disk when said storage disk is not rotating;

a voice coil motor operable to move said actuator arm relative to said disk in response to a control signal; and a controller operable to generate said control signal and deliver said control signal to said voice coil motor such that said actuator arm moves in a direction from a starting track to a target track according to a seek velocity profile, wherein said seek velocity profile includes at least an acceleration portion and a deceleration portion, and said seek velocity profile is derated based on at least a direction of travel of said actuator arm, wherein at least said deceleration portion of said seek velocity profile is derated by a variable amount when said actuator arm moves toward said ramp and said target track is within a predefined distance from said ramp, wherein said variable amount is determined based on at least one of said target track, a power supply voltage, a temperature, a spindle back electromotive force, and a positioner gain, wherein said variable amount also includes a warping factor based on at least one of a seek length and a back electromotive force of said voice coil motor, and wherein said warping factor is determined according to the equation:

$$Warp\_factor=\sqrt{2a}\times\sqrt{(1+Kwarp\times Vel)\times xtg}$$

where a is the deceleration of said transducer according to said deceleration portion of said seek velocity profile, Vel is the velocity of said transducer, xtg is the distance from said starting track to said target track, and kwarp is a variable determined by an amount of back electromotive force available from said voice coil motor during said deceleration portion of said seek velocity profile.

43. A disk drive, comprising:

storage means for storing data;

rotation means for rotating said storage means;

read/write means for reading and writing data to said storage means;

actuation means for moving and read/write means from a starting location to a target location within said storage means; and control means for controlling said actuation means such that said actuation means move said read/write means according to a first velocity profile for use during normal non-park operations, when said starting location is a first direction from said target location, and according to a second velocity profile, different from said first velocity profile, when said starting location is a second direction from said target location and said target location is within a predefined distance from a reference location within said storage means.

44. The disk drive, as claimed in claim 43, wherein:

said reference location is located at an inner diameter of said storage means.

45. The disk drive, as claimed in claim 43, wherein:

said reference location is located at an outer diameter of said storage means.

46. The disk drive, as claimed in claim 43, wherein:

at least a deceleration portion of said second velocity profile is derated by a predefined factor of said first velocity profile.

47. The disk drive, as claimed in claim 46, wherein:

said predefined factor is one-half.

48. The disk drive, as claimed in claim 43, wherein:

said second velocity profile is derated by a variable factor of said first velocity profile.

49. The disk drive, as claimed in claim 48, wherein:

said variable factor is determined based on at least one of said target location, a power supply voltage, a temperature, a back electromotive force of said rotation means, and a positioner gain.

50. The disk drive, as claimed in claim 49, wherein:

said variable factor is further determined based on a warping factor, wherein said warping factor is determined based on at least one of a seek length and a back electromotive of said actuation means.

51. A disk drive, comprising:

storage means for storing data;

rotation means for rotating said storage means;

read/write means for reading and writing data to said storage means;

actuation means for moving and read/write means from a starting location to a target location within said storage means; and control means for controlling said actuation means such that said actuation means move said read/write means according to a first velocity profile when said starting location is a first direction from said target location, and according to a second velocity profile when said starting location is a second direction from said target location and said target location is within a predefined distance from a reference location within said storage means, wherein said second velocity profile is derated by a variable factor of said first velocity profile, and wherein said variable factor is determined according to the following equation:

$$\text{Derate\_factor} = \frac{(\text{ref\_loc} - \text{tgt\_loc})^2 \times 127}{2^{26} \times \sqrt{2a}} + 0.5$$

where ref_loc is the number of the reference location, tgt_loc is the number of the target location, and a is the deceleration of said read/write means during a deceleration portion of said second velocity profile.

52. A disk drive, comprising:

storage means for storing data;

rotation means for rotating said storage means;

read/write means for reading and writing data to said storage means;

actuation means for moving and read/write means from a starting location to a target location within said storage means; and control means for controlling said actuation means such that said actuation means move said read/write means according to a first velocity profile when said starting location is a first direction from said target location, and according to a second velocity profile when said starting location is a second direction from said target location and said target location is within a predefined distance from a reference location within said storage means, wherein said second velocity profile is derated by a variable factor of said first velocity profile, wherein said variable factor is determined based on at least one of said target location, a power supply voltage, a temperature, a back electromotive force of said rotation means, and a positioner gain, and wherein said warping factor is determined according to the following equation:

$$Warp\_factor=\sqrt{2a}\times\sqrt{(1+Kwarp\times Vel)\times xtg}$$

where a is the deceleration of said read/write means during said deceleration portion of said second velocity profile, Vel is the velocity of said read/write means, xtg is the distance from said starting location to said target location, and kwarp is a variable determined by an amount of back electromotive force available from said actuation means during said deceleration portion of said second velocity profile.

* * * * *